(12) United States Patent
Wu

(10) Patent No.: US 11,712,619 B2
(45) Date of Patent: Aug. 1, 2023

(54) HANDLE CONTROLLER

(71) Applicant: Qingdao Pico Technology Co., Ltd., Qingdao (CN)

(72) Inventor: Tao Wu, Qingdao (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/877,219

(22) Filed: Jul. 29, 2022

(65) Prior Publication Data

US 2022/0362659 A1    Nov. 17, 2022

Related U.S. Application Data

(63) Continuation of application No. PCT/CN2021/118171, filed on Sep. 14, 2021.

(51) Int. Cl.
*A63F 13/24*   (2014.01)
*A63F 13/213*   (2014.01)
(Continued)

(52) U.S. Cl.
CPC .......... *A63F 13/213* (2014.09); *A63F 13/211* (2014.09); *A63F 13/24* (2014.09); *G06F 3/0346* (2013.01); *A63F 2300/8082* (2013.01)

(58) Field of Classification Search
CPC ....... A63F 13/24; A63F 13/211; A63F 13/213
See application file for complete search history.

(56) References Cited

U.S. PATENT DOCUMENTS 11,016,566 B1 *   5/2021   Long ................ G06F 3/0325
2006/0277571 A1 *   12/2006   Marks ................ A63F 13/42
725/37
(Continued)

FOREIGN PATENT DOCUMENTS

CN         1794010 A      6/2006
CN       105511649 A      4/2016
(Continued)

OTHER PUBLICATIONS

First Office Action issued by the Chinese Patent Office dated May 5, 2022 with respect to Chinese priority application No. 202011242190.X.

*Primary Examiner* — David L Lewis
*Assistant Examiner* — Shauna-Kay Hall
(74) *Attorney, Agent, or Firm* — Saliwanchik, Lloyd & Eisenschenk

(57) ABSTRACT

Disclosed is a handle controller which includes a handle body and a light-emitting unit, the light-emitting unit being provided at an end of the handle body and forming a preset angle with the handle body; the light-emitting unit includes a first surface, a second surface, a plurality of first light-emitting marks and a plurality of second light-emitting marks, the second surface covering the first surface; the first light-emitting marks and the second light-emitting marks are both provided on the first surface, and the plurality of first light-emitting marks are distributed annularly; the first light-emitting marks and the second light-emitting marks are configured to illuminate so as to be captured by an imaging device; the first light-emitting marks illuminate for a first period, and the second light-emitting marks illuminate for a second period.

17 Claims, 2 Drawing Sheets

(51) Int. Cl.
*A63F 13/211* (2014.01)
*G06F 3/0346* (2013.01)

(56) References Cited

U.S. PATENT DOCUMENTS

| | | | | |
|---|---|---|---|---|
| 2010/0184513 A1* | 7/2010 | Mukasa | | A63F 13/00 |
| | | | | 463/37 |
| 2011/0081969 A1 | 4/2011 | Ikeda et al. | | |
| 2013/0307772 A1 | 11/2013 | Wu | | |
| 2016/0364910 A1* | 12/2016 | Higgins | | A63F 13/24 |
| 2018/0311575 A1* | 11/2018 | Bristol | | A63F 13/23 |
| 2018/0329484 A1* | 11/2018 | Steedly | | G02B 27/017 |
| 2018/0329517 A1* | 11/2018 | Steedly | | A63F 13/25 |
| 2019/0012835 A1* | 1/2019 | Bleyer | | G06T 19/006 |
| 2019/0302903 A1* | 10/2019 | Atlas | | G06F 3/03545 |
| 2019/0318501 A1* | 10/2019 | Balan | | A63F 13/212 |

FOREIGN PATENT DOCUMENTS

| | | | |
|---|---|---|---|
| CN | 107219963 | A | 9/2017 |
| CN | 108257177 | A | 7/2018 |
| CN | 110119192 | A | 8/2019 |
| CN | 110573993 | A | 12/2019 |
| CN | 110837295 | A | 2/2020 |
| CN | 111354018 | A | 6/2020 |
| CN | 111459279 | A | 7/2020 |
| CN | 112451962 | A | 3/2021 |

* cited by examiner

HANDLE CONTROLLER

CROSS-REFERENCE TO RELATED APPLICATIONS

This application is a continuation application of International Application No. PCT/CN2021/118171, filed Sep. 14, 2021, which claims priority to Chinese Patent Application No. 202011242190.X, filed Nov. 9, 2020; both of which are hereby incorporated by reference in their entireties.

TECHNICAL FIELD

Embodiments of the present disclosure relate to the technical field of virtual reality, and particularly to a handle controller.

BACKGROUND

With the development of VR (Virtual Reality), AR (Augmented Reality) and MR (Mixed Reality) technologies, a handle plays an increasingly important role. With a handle, a user interacts with scenes of virtual reality, augmented reality and mixed reality.

At present, an electromagnetic transmitter may be embedded in a handle, and an electromagnetic receiver may be embedded in a VR headset integrated machine, and the position and attitude information of the handle in a three-dimensional space may be calculated in real time through the principle of electromagnetic tracking. An ultrasonic transmitter can also be embedded in the handle, and an ultrasonic receiver may be embedded in the VR headset integrated machine, and the position and attitude information of the handle in the three-dimensional space may be calculated in real time through the principle of ultrasonic tracking.

The handle, however, has an electromagnetic sensor that is sensitive to and tends to be disturbed by complex electromagnetic signals in the environment, causing the electromagnetic sensor to generate erroneous electromagnetic tracking data about the handle. For example, the electromagnetic sensor of the handle is disturbed by other electromagnetic signals when it is relatively close to a computer host, or in an environment that is relatively close to an audio, TV, refrigerator, etc., and thus degrading the tracking performance of the handle. Therefore, handles using the electromagnetic sensor are greatly limited in use. Similarly, handles using an ultrasonic sensor are also greatly limited in use.

SUMMARY

An object of an embodiment of the present disclosure is to provide an improved handle controller.

According to an embodiment of the present disclosure, a handle controller is provided, including:

a handle body;

a light-emitting unit, the light-emitting unit being provided at an end of the handle body and forming a preset angle with the handle body;

the light-emitting unit includes a first surface, a second surface, a plurality of first light-emitting marks and a plurality of second light-emitting marks, the second surface covering the first surface; the first light-emitting marks and the second light-emitting marks are both provided on the first surface, and the plurality of first light-emitting marks are distributed annularly;

the first light-emitting marks and the second light-emitting marks are configured to illuminate so as to be captured by an imaging device;

the first light-emitting marks illuminate for a first period, and the second light-emitting marks illuminate for a second period.

Optionally, there are seventeen first light-emitting marks and two second light-emitting marks, and the two second light-emitting marks are symmetrically provided among the seventeen first light-emitting marks.

Optionally, there are twenty first light-emitting marks and two second light-emitting marks, the second light-emitting marks are in a strip shape, one of the second light-emitting marks is provided at an upper edge of the first surface, the other of the second light-emitting marks is provided at an lower edge of the first surface, and the twenty first light-emitting marks are distributed between the two second light-emitting marks.

Optionally, the preset angle is 40°-135°.

Optionally, the first light-emitting marks have a wavelength in a range of 450 nm-690 nm.

Optionally, both the first surface and the second surface are annular.

Optionally, a ratio of the radius of the first surface to the radius of the second surface is 1:1.5.

Optionally, the plurality of first light-emitting marks are connected in series.

Optionally, the plurality of second light-emitting marks are connected in series.

Optionally, further including: a wireless transmission module provided on the handle body.

Optionally, further including:

a sensor provided on the handle body.

Optionally, a blinking frequency of the first light-emitting marks is 30 Hz.

Optionally, both the first period and the second period are 15 us-100 us.

A beneficial effect of the technical solutions of the embodiments of the present disclosure is that by capturing the first light-emitting mark and the second light-emitting mark on the handle controller with the imaging device, it is possible to calculate the position and attitude information of the handle controller in three-dimensional space in real time and accurately, and thus it is very easy to operate. Moreover, the capturing process is not influenced by electromagnetic wave signals and ultrasonic signals in the surrounding environment, and thus the handle controller can be widely applied.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which are incorporated in the description and constitute a part of the description, illustrate embodiments of the present disclosure and, together with the description thereof, serve to explain the principles of the present disclosure.

Figure 1:
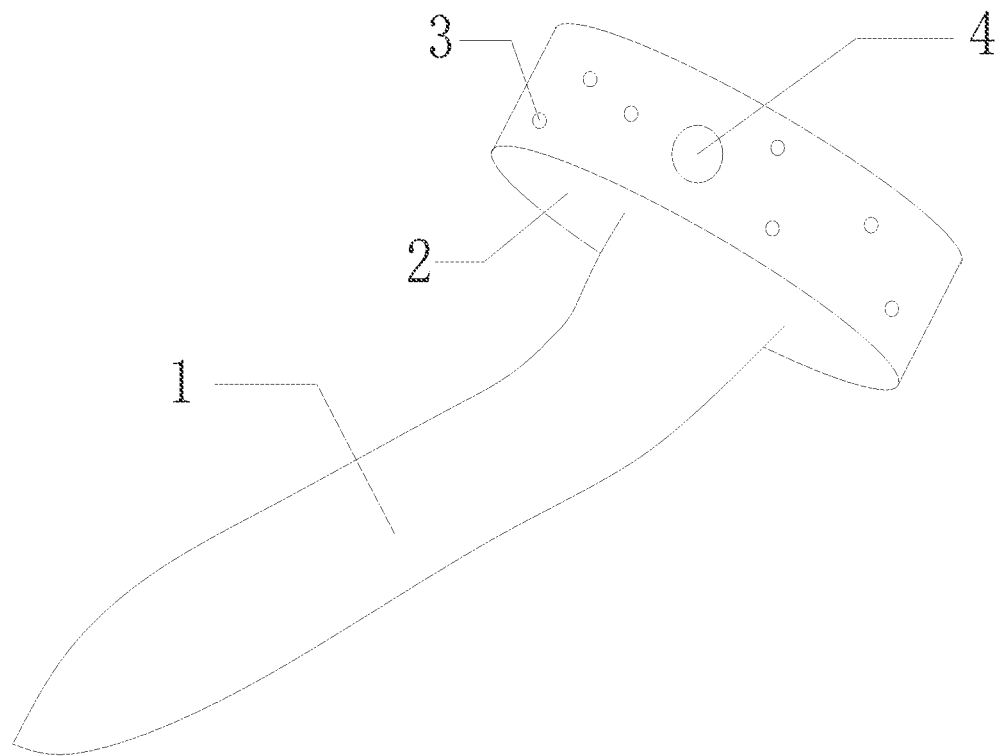
FIG. 1 is a schematic structural view of a handle controller according to an embodiment of the present disclosure.

In the figures: 1. handle body; 2. light-emitting unit; 3. first light-emitting mark; 4. second light-emitting mark.

DETAILED DESCRIPTION

Various exemplary embodiments of the present disclosure will now be described in detail with reference to the accompanying drawings. It should be noted that the relative arrangement, numerical expressions and numerical values of the components and steps set forth in these examples do not limit the scope of the disclosure unless otherwise specified.

The following description of at least one exemplary embodiment is in fact merely illustrative and is in no way intended as a limitation to the present disclosure and its application or use.

Techniques, methods, and apparatus known to those of ordinary skill in the relevant art may not be discussed in detail but where appropriate, the techniques, methods, and apparatus should be considered as part of the description.

Among all the examples shown and discussed herein, any specific value should be construed as merely illustrative and not as a limitation. Thus, other examples of exemplary embodiments may have different values.

It should be noted that similar reference numerals and letters denote similar items in the accompanying drawings, and therefore, once an item is defined in a drawing, and there is no need for further discussion in the subsequent accompanying drawings.

As shown in FIGS. 1-4, this embodiment provides a handle controller, which facilitates an imaging device to capture first light-emitting marks 3 and second light-emitting marks 4 on the handle controller, and thus enables calculation of the position and attitude information of the handle controller in three-dimensional space in real time and accurately.

Specifically, the handle controller includes a handle body 1 and a light-emitting unit 2; the light-emitting unit 2 is provided at an end of the handle body 1 and forms a preset angle with the handle body 1; the light-emitting unit 2 includes a first surface, a second surface, a plurality of first light-emitting marks 3, and a plurality of second light-emitting marks 4. The second surface covers the first surface; the first light-emitting marks 3 and the second light-emitting marks 4 are both provided on the first surface, and the plurality of first light-emitting marks 3 are annularly distributed; the first light-emitting marks 3 and the second light-emitting marks 4 are configured to illuminate so as to be captured by the imaging device; the first light-emitting marks 3 illuminate for a first period, and the second light-emitting marks 4 illuminate for a second period.

In the embodiment, the imaging device is implemented as two or more Camera tracking Cameras built into a VR headset integrated machine, which are used to capture the first light-emitting marks 3 and second light-emitting marks 4 on the optical handle controller in real time. By detecting the position area of the second light-emitting marks 4 on an image of the handle controller, it is possible to determine on the image a rough position of the light spot of the first light-emitting marks 3 on the handle controller. After that, at the position area on the image, two-dimensional position coordinates of the light spots corresponding to the first light-emitting marks 3 and the second light-emitting marks 4 on the handle controller on the tracking Camera image are detected in real time by computer image processing algorithm. Then, two-dimensional position coordinates on the image corresponding to each first light-emitting mark 3 and each second light-emitting mark 4 on the handle controller are matched by computer vision algorithm. Finally, the attitude and position information of the handle controller relative to the current three-dimensional space environment are derived from optimization and iteration through PNP attitude calculation algorithm.

Through setting rules for positions of the first light-emitting marks 3 and the second light-emitting marks 4 on the light-emitting unit 2, it is possible to improve the tracking stability of the handle controller under the condition that the light sources of the surrounding environment are relatively complex, so as to make the attitude tracking information of 6 directional DOFs (degrees of freedom) of the handle controller more stable and accurate.

Figure 2:
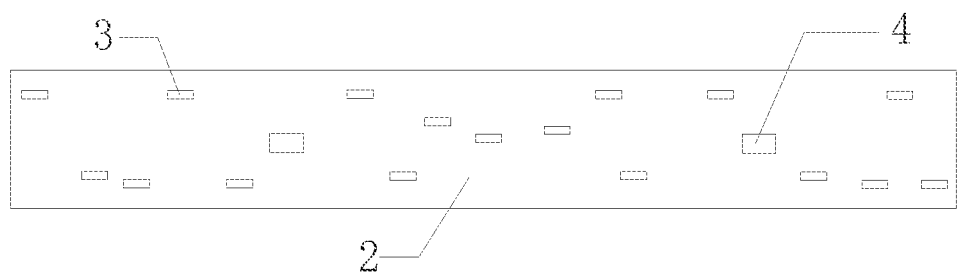
FIG. 2 is a schematic view of a first surface in FIG. 1 when unfolded.

Optionally, as shown in FIGS. 1 and 2, the number of the first light-emitting marks 3 is seventeen, and the number of the second light-emitting marks 4 is two. The two second light-emitting marks 4 are symmetrically provided among the seventeen first light-emitting marks 3.

In the embodiment, the two second light-emitting marks 4 arranged in a certain geometric shape and the seventeen first light-emitting marks 3 simultaneously exist on a circuit board, the seventeen first light-emitting marks 3 being connected to each other in series, and the two second light-emitting marks 4 being connected to each other in series.

In addition, the seventeen first light-emitting marks 3 and the two second light-emitting marks 4 arranged in a certain geometric shape will illuminate synchronically according to a certain duty cycle, and the illuminating period may range from 15 us to 100 us. After the parameters of the hardware and those for controlling the first light-emitting marks 3 and the second light-emitting marks 4 are determined, the first and last frames of the illuminating period of the first light-emitting marks 3 must be the same as those of the second light-emitting marks 4.

Figure 3:
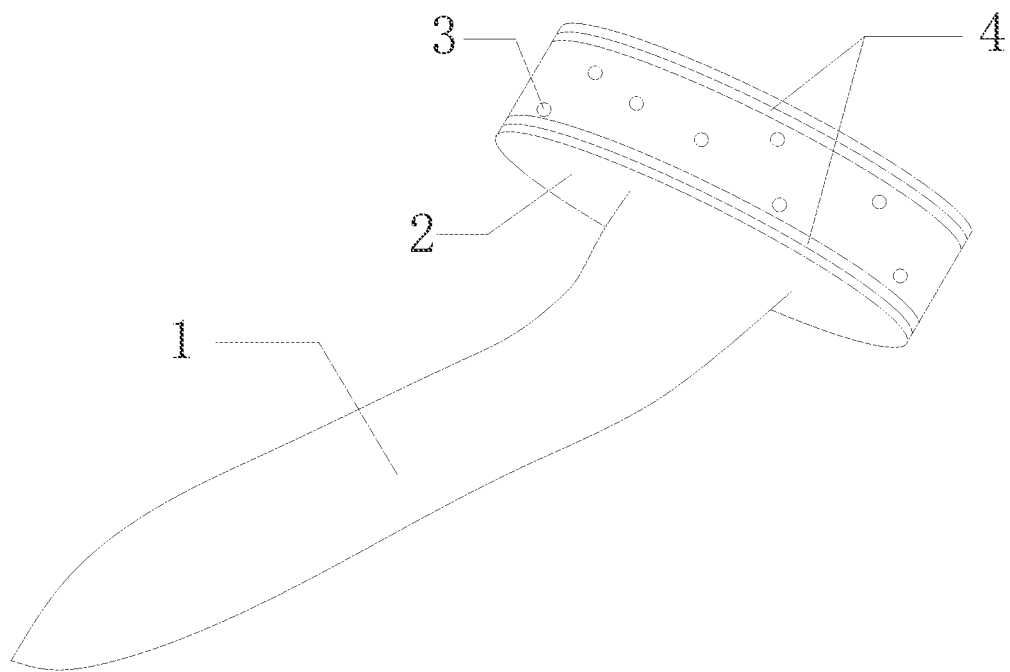
FIG. 3 is a schematic structural view of a handle controller according to another embodiment of the present disclosure.
Figure 4:
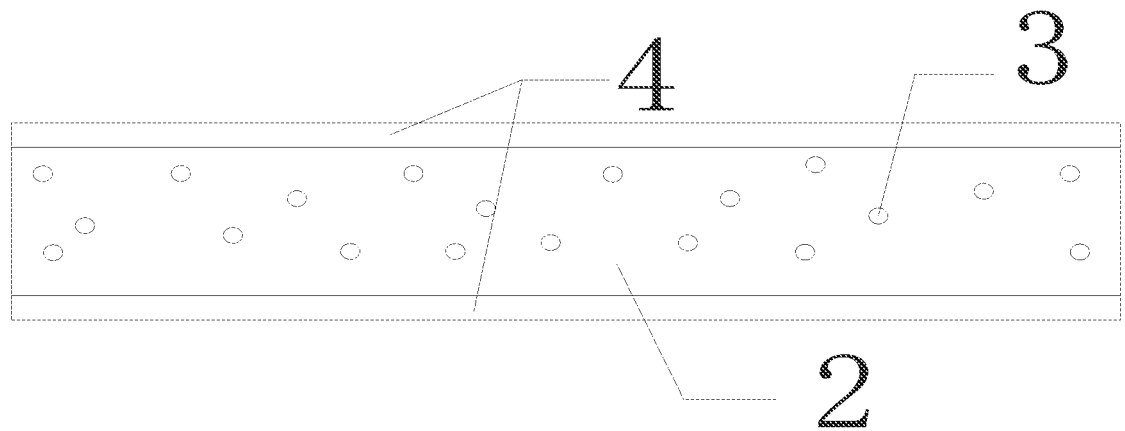
FIG. 4 is a schematic view of a first surface in FIG. 3 when unfolded.

Optionally, as shown in FIGS. 3 and 4, the number of the first light-emitting marks 3 is twenty, and the number of the second light-emitting marks 4 is two. Moreover, each of the second light-emitting marks 4 is in the shape of a strip, one of the second light-emitting marks 4 is arranged on the upper edge of the first surface, the other of the second light-emitting marks 4 is arranged on the lower edge of the first surface, and the twenty first light-emitting marks 3 are distributed between the two second light-emitting marks 4.

In the embodiment, the physical position distribution on the first surface of the twenty first light-emitting marks 3 on the left-hand handle controller and that of the twenty first light-emitting marks 3 on the right-hand handle controller may be physically symmetrically distributed according to a certain symmetry rule.

Optionally, the preset angle is 40°-135°, which not only conforms to the user's usage habits and is convenient for holding the handle body 1, but also facilitates the imaging device to capture the first light-emitting marks 3 and the second light-emitting marks 4.

Optionally, the wavelength range of the first light-emitting marks 3 is 450 nm-690 nm, which facilitates the imaging device to capture the first light-emitting marks 3.

In the embodiment, the first light-emitting marks 3 are in the infrared band, with wavelength thereof being 850 nm or 940 nm.

Optionally, both the first surface and the second surface are annular.

Optionally, a ratio of the radius of the first surface to the radius of the second surface is 1:1.5, which facilitates the arrangement of the first light-emitting marks 3 and the second light-emitting marks 4 between the first surface and the second surface, as well as the protection of the first light-emitting marks 3 and the second light-emitting marks 4 by the second surface.

Optionally, a plurality of the first light-emitting marks 3 are connected in series and provided on the same circuit board, which facilitates simultaneous illumination of the first light-emitting marks 3 and thereby facilitating capturing of the first light-emitting marks 3 by the imaging device.

Optionally, a plurality of the second light-emitting marks 4 are connected in series and provided on the same circuit board, which facilitates simultaneous illumination of the second light-emitting marks 4 and thereby facilitating capturing of the second light-emitting marks 4 by the imaging device.

Optionally, a wireless transmission module is further included, which is provided on the handle body 1.

In the embodiment, the handle controller also includes a wireless transmission module which is built into the VR headset integrated machine. Then, a control processing unit built in the VR headset integrated machine synchronizes the blinking frequency of each first light-emitting mark 3 and each second light-emitting mark 4 of the handle controller with the exposure shutter of the tracking Camera built in the VR headset integrated machine. That is, the first light-emitting marks 3 and second light-emitting marks 4 on the handle controller will illuminate during the opening period of the exposure shutter of the tracking Camera built in the VR headset integrated machine in each frame. Considering the power consumption and the actual use environment of the handle and other aspects, the illuminating period of the first light-emitting marks 3 and the second light-emitting marks 4 is generally about 15 us-100 us. Considering the synchronization accuracy, the exposure period of the tracking Camera is generally about 30 us-150 us, such that it is possible to sufficiently capture the illuminating periods of the first light-emitting marks 3 and the second light-emitting marks 4 within the exposure period of the tracking Camera, and the capture frequency of the tracking Camera is adjusted to 60 Hz. In order to avoid the first light-emitting marks 3 and the second light-emitting marks 4 from being illuminated at the same time and thus avoid the formation of coincidence or adhesion on the image of the tracking Camera, the first light-emitting marks 3 and second light-emitting marks 4 will illuminate separately. For example, the second light-emitting marks 4 illuminate at odd-numbered frames captured by the tracking Camera, and the first light-emitting marks 3 illuminate at even-numbered frames captured by the tracking Camera. Herein, both the first light-emitting marks 3 and the second light-emitting marks 4 can be LED lights. With the information on the physical characteristics of the second light-emitting marks 4, it is possible to detect and track the area of the second light-emitting marks 4 on the image at the odd-numbered frames of the tracking Camera in real time. The area is an area where the light spot of the first light-emitting marks 3 of the handle controller is located, and is a rectangular area. Considering the movement speed of the handle, the rectangle corresponding to this area is extended by 1.5 times the length of the long side and the short side on the image at the even-numbered frames of the tracking Camera by using the area of the image corresponding to the second light-emitting marks 4 on the image at the previous odd frame. That is, forming the area of the image where the light spot of the first light-emitting marks 3 on the handle controller is located under the current frame, and detecting the light spot of the first light-emitting marks 3 in this area, while the image area outside this area is not detected. In this way, it is possible to greatly reduce the accuracy and stability of detecting the light spot of the first light-emitting marks 3, as well as the complexity of detecting the light spot, thereby improving the detection efficiency to a certain extent. It should be noted that 1.5 times is the maximum range in the actual test of the movement distance between the first and last frames of the maximum movement speed of the handle controller at a frequency of 60 Hz of the corresponding tracking Camera in the actual environment.

In addition, the human eye does not perceive flicker since it is sensitive to flicker of light above 50 Hz. The light spots of the first light-emitting marks 3 and the second light-emitting marks 4, however, are captured by the VR head-mounted tracking Camera at a frequency of 30 Hz. That is, the blinking frequency of the first light-emitting mark and the second light-emitting marks 4 on the handle controller is 30 Hz according to the above steps, which is not very friendly for users to observe with their eyes in the actual environment since the human eye will perceive the flicker at 30 Hz. That is, after the handle controller and the tracking camera of the VR headset integrated machine are synchronized wirelessly at the beginning of the device operation, the first light-emitting marks 3 and second light-emitting marks 4 of the handle controller illuminate twice on average and the illuminating period of each time is also 15 us-100 us during the period from the start time of each frame of the tracking Camera to the time before the exposure shutter of the tracking Camera is opened in each frame. In this way, the frequency of 33 Hz per second makes the first light-emitting marks 3 and second light-emitting marks 4 of the handle controller illuminate 99 times, therefore satisfying an range above the sensitivity of human eyes to flicker of light.

In the present application, the illuminating period of all the first light-emitting marks 3 and the second light-emitting marks 4 is the same in each frame, which facilitates accurate capturing of the first light-emitting marks 3 and the second light-emitting marks 4 by the imaging device.

Optionally, the tracking distance range of the handle controller can support 3 cm-150 cm, which is convenient for a user to better interact with virtual reality, augmented reality and mixed reality via the handle controller.

Optionally, further including:
a sensor provided on the handle body 1.

For example, an IMU inertial navigation sensor is embedded in the handle controller, and the sensor is at least a six-axis sensor, that is, an accelerometer unit sensor and a gyroscope unit sensor; it may also be a nine-axis sensor, that is, an accelerometer unit sensor, a gyroscope unit sensor and a geomagnetic unit sensor. Wherein, the output frequency of the IMU inertial navigation sensor is at least 90 Hz.

In addition, a wireless network transmission unit is embedded in the handle controller, a transmission protocal of which may be a 2.4 G network protocol or a BLE (Bluetooth Low Energy) protocol. In addition, the wireless transmission frequency is 100 Hz or more.

Via the IMU inertial navigation sensor, it is possible to accurately acquire information about the 6 directional DOFs (degrees of freedom) of the handle controller at high frequencies.

Optionally, the blinking frequency of the first light-emitting marks 3 is 30 Hz, which facilitates the imaging device to capture the first light-emitting marks 3.

Optionally, the first light-emitting marks 3 and the second light-emitting marks 4 have an illuminating period of 15 us-100 us, which facilitates the imaging device to accurately capture the first light-emitting marks 3 and the second light-emitting marks 4.

In the embodiment, by capturing the first light-emitting marks 3 and the second light-emitting marks 4 on the handle controller with the imaging device, it is possible to calculate the position and attitude information of the handle controller in three-dimensional space in real time and accurately, and is very easy to operate. Moreover, the capturing process is not influenced by electromagnetic wave signals and ultrasonic signals in the surrounding environment, and thus the handle controller can be widely applied.

While certain specific embodiments of the present disclosure have been illustrated by way of example, it will be understood by those skilled in the art that the foregoing examples are provided for the purpose of illustration and are not intended to limit the scope of the present disclosure. It will be understood by those skilled in the art that the foregoing embodiments may be modified without departing from the scope and spirit of the disclosure. The scope of the present disclosure is subject to the attached claims.

The invention claimed is:

1. A handle controller, comprising:
   a handle body; and
   a light-emitting unit, the light-emitting unit being provided at an end of the handle body and forming a preset angle with the handle body, wherein:
   the light-emitting unit includes a first surface, a second surface, a plurality of first light-emitting marks and a plurality of second light-emitting marks different from the plurality of first light-emitting marks, the second surface covering the first surface;
   the first light-emitting marks and the second light-emitting marks are both provided on the first surface, and the plurality of first light-emitting marks are distributed annularly;
   the first light-emitting marks and the second light-emitting marks are configured to illuminate so as to be captured by an imaging device; and
   the first light-emitting marks illuminate for a first period, and the second light-emitting marks illuminate for a second period different from the first period.

2. The handle controller of claim 1, wherein there are seventeen first light-emitting marks and two second light-emitting marks, and the two second light-emitting marks are symmetrically provided among the seventeen first light-emitting marks.

3. The handle controller of claim 1, wherein there are twenty first light-emitting marks and two second light-emitting marks, the second light-emitting marks are in a strip shape, one of the second light-emitting marks is provided at an upper edge of the first surface, the other of the second light-emitting marks is provided at an lower edge of the first surface, and the twenty first light-emitting marks are distributed between the two second light-emitting marks.

4. The handle controller of claim 1, wherein the preset angle is 40°-135°.

5. The handle controller of claim 1, wherein the first light-emitting marks have a wavelength in a range of 450 nm-690 nm.

6. The handle controller of claim 1, wherein both the first surface and the second surface are annular.

7. The handle controller of claim 6, wherein a ratio of the radius of the first surface to the radius of the second surface is 1:1.5.

8. The handle controller of claim 1, wherein the plurality of first light-emitting marks are connected in series.

9. The handle controller of claim 1, wherein the plurality of second light-emitting marks are connected in series.

10. The handle controller of claim 1, further comprising: a wireless transmission module provided on the handle body.

11. The handle controller of claim 1, further comprising: a sensor provided on the handle body.

12. The handle controller of claim 1, wherein a blinking frequency of the first light-emitting marks is 30 Hz.

13. The handle controller of claim 1, wherein both the first period and the second period are 15 us-100 us.

14. The handle controller of claim 1, wherein the first light-emitting marks are in the infrared band, with wavelength thereof being 850 nm or 940 nm.

15. The handle controller of claim 11, wherein the sensor is a six-axis sensor comprising an accelerometer unit sensor and a gyroscope unit sensor.

16. The handle controller of claim 11, wherein the sensor is a nine-axis sensor comprising an accelerometer unit sensor, a gyroscope unit sensor and a geomagnetic unit sensor.

17. The handle controller of claim 11, wherein the sensor acquires information about the 6 directional DOFs of the handle controller.

* * * * *